April 20, 1965

R. WALTER 3,179,263

TOBACCO HARVESTER

Filed Aug. 6, 1962

INVENTOR
*Ross Walter,*

BY *Smith, Michael and Gardiner*

ATTORNEYS

United States Patent Office 3,179,263
Patented Apr. 20, 1965

3,179,263
TOBACCO HARVESTER
Ross Walter, Willow St., Lancaster, Pa.
Filed Aug. 6, 1962, Ser. No. 215,072
16 Claims. (Cl. 214—5.5)

This invention is a tobacco harvesting machine including means for spearing the tobacco stalks onto supporting laths.

The machine is adapted to be attached to the underframing of a conventional tractor having a high clearance, and supported beneath the tractor above ground level, and includes a stalk pickup mechanism at the front end of the apparatus designed to be slidingly supported upon the ground over which the tractor moves, to pick up stalks of cut tobacco which have laid in the field after cutting, a sufficient length of time to be properly withered.

The apparatus includes means for picking up the stalks individually and delivering them to a spearing mechanism carried by the machine, there being a means between the pickup mechanism and the spearing mechanism for rolling the stalks about their axes to compact the leaves gently about the stalks.

The apparatus further includes means for moving the stalks, one at a time, into a spearing mechanism which will thread a predetermined number of the stalks upon a lath, in longitudinally spaced relation thereon, said lath subsequently functioning to support the stalks in conventional fashion in curing barns.

The apparatus includes means automatically to remove a lath, on which a predetermined number of stalks have been threaded, from the spearing mechanism to a conveyor for delivery to a point beyond the machine.

The apparatus includes means for supplying an additional lath to the spearing mechanism after removal of a full or loaded lath therefrom.

These and other objects will appear from reading the following specification in the light of the accompanying drawings wherein:

General description

The apparatus generally includes a main supporting frame including longitudinal beam members 1, 2 and 3 interconnected by cross frame members 4, 4a, 4b, together with supporting bracket members 5 and 6 at the front and rear of the main frame respectively, by which the main machine frame is attached to underframe parts of the tractor, portions of which are indicated at 7, 7a and 7b. At the forward part of the main frame of the machine a pickup mechanism is mounted, the same being indicated generally by the reference character A. As will be more particularly described hereinafter, the pickup means is pivotally mounted on brackets carried by the main frame and may be raised and lowered about this point of support by hydraulic means indicated generally at 8, when it is desired to move the machine from place to place. The hydraulic means is connected to the conventional pressurized hydraulic system on the tractor and is under the control of the operator of the tractor.

The pickup mechanism A, in operation, moves over the ground on which it is slidingly supported by shoes on the front end thereof and operates to pick up the withered stalks of tobacco and carry them upwardly and deliver them to a feeding mechanism which is shown generally at B. The stalks are individually fed to a spearing mechanism indicated generally at C by a conveyor chain having stalk-engaging fingers which impale the stalks on a lath, whereupon the lath and stalks impaled thereon are raised and moved laterally by an elevator mechanism indicated generally at D to a conveyor belt 9 for delivery to a point rearwardly of the apparatus.

Means for supplying additional laths to the spearing mechanism is indicated generally by the reference character E.

Pickup mechanism

At the forward end of the main frame of the machine are mounted upstanding side brackets 10–10a which pivotally support at 11 spaced side frames 12–12a of the structure which supports the pickup mechanism when in operation. The side frames 12–12a are secured in spaced relation by any suitable means, such as cross frame members 12b, and at its lower forward end of said structure is attached a plurality of skids or shoes 13 each of which carries an upper wing plate 14 (see FIG. 1). The wing plates 14 are generally horizontally disposed and extend laterally of the respective shoe members 13 and serve to limit the extent of penetration of the shoe members 13 into the soil over which the machine is being moved.

Mounted for rotation in the side frames 12–12a at the forward lower ends thereof is a shaft 15 on which is mounted a roller 16 over which a plurality of belts 17 are trained, which belts are trained over a second transversely disposed roller 18 mounted on a shaft 19 at the upper end of the pickup frame, the axis of which may be coincident with the pivot points 11 of the pickup frame. Intermediate the rollers 16 and 18 there is mounted another transversely disposed roller shaft 20 on which roller 21 is mounted. It will be noted from the arrangement shown more particularly in FIG. 1 that the belt members 17 extend the full length of the pickup frame between rollers 16 and 18, whereas the rollers 21 and 18 disposed between the belts 17 provide support for shorter belts indicated at 22. All of the belts are spaced substantially equidistant from one another along the respective rollers.

Figures 3, 3A:
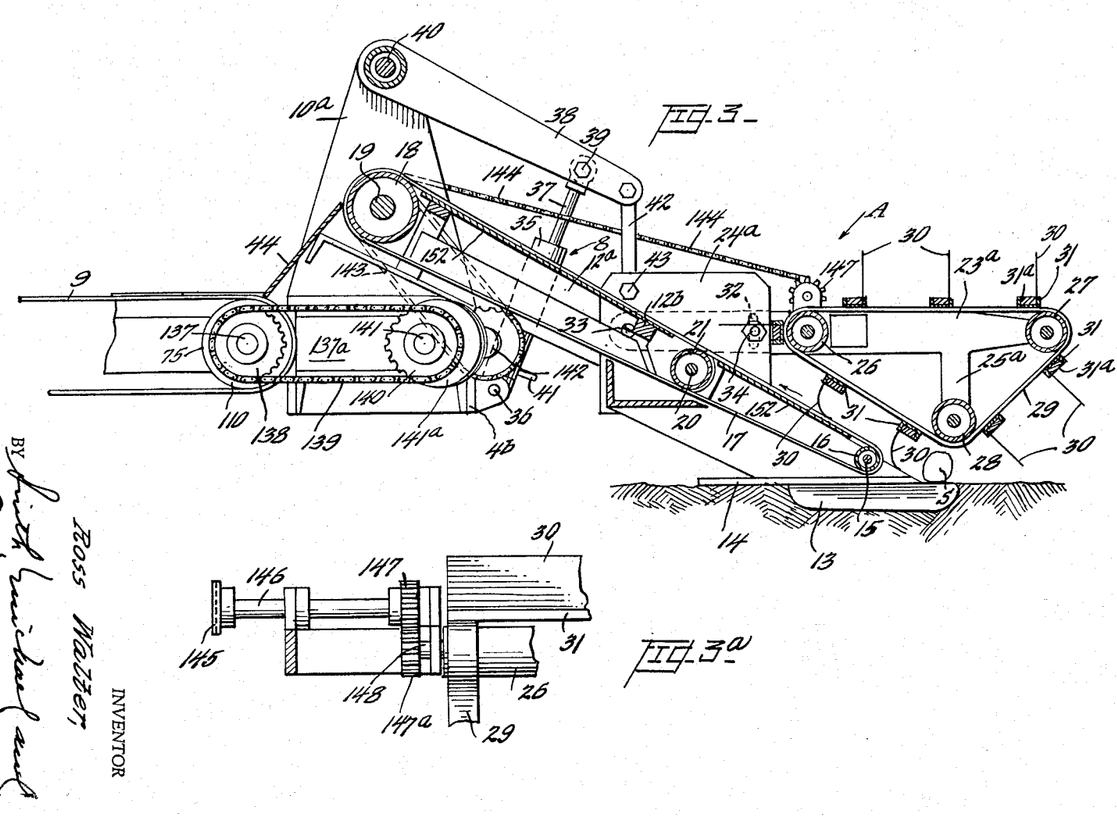
FIG. 3 is a partial sectional view taken on the section line 3—3 of FIG. 1.
FIG. 3a is a detail sectional view showing the drive for the upper system of belts.

The pickup mechanism includes a supplemental frame comprising spaced side members 23–23a pivotally attached respectively to side bracket members 24–24a, which brackets are rigidly secured to side frame 12–12a respectively. The side frame members 23–23a are provided with downwardly extending bracket arms 25–25a and the spaced side frames support for rotation, transversely disposed rollers 26, 27 and 28 as shown in FIG. 3. A plurality of belts 29 are trained over said rollers in generally triangular form as shown and are spaced equally lengthwise of said rollers (see FIG. 1 and 2). The belts 29 carry means for facilitating the pickup mechanism in gathering the stalks of tobacco from the field, said means being in the form of flexible flaps 30 attached to the belts in any suitable manner such as by channel shaped cleats 31 and blocks 31a as shown. The belts 29 as thus arranged each provides a bottom run which overlies in substantial vertical alignment a top run of a lower belt 17, and for cooperation with the belts 17 are driven in the same direction, which will become apparent from a more complete description of the drive means for these belts as will appear hereinafter.

The spaced frames 23–23a, which support the rollers 26, 27 and 28, and the belts 29 driven thereby, may be adjusted vertically with respect to the belts 17 by any convenient means such as by arcuate slots 32 provided in said side frames 23–23a by which the side frames may be adjusted with respect to the brackets 24–24a about pivots 33 and secured in adjusted position by the clamping bolts 34.

Figures 1, 2:
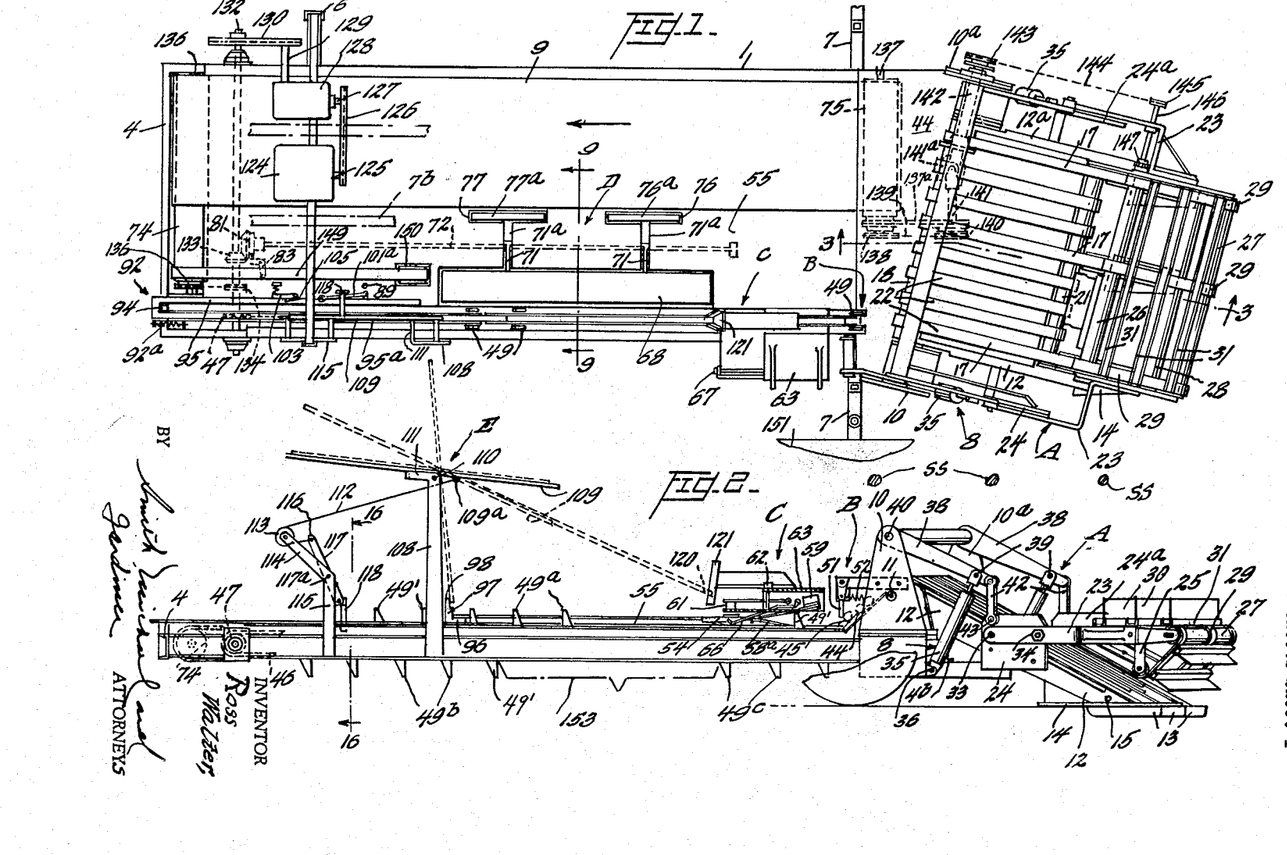
FIG. 1 is a top plan view of the invention with the supporting brackets omitted.
FIG. 2 is a side elevation of the invention with the supporting brackets omitted.

The pickup mechanism as a whole may be moved from an operative position as shown in FIGS. 2 and 3 to an inoperative position wherein the shoes or skids 13 are raised a desired degree above ground level, by the hydraulic cylinder mechanism 8 previously referred to. This mechanism includes a cylinder 35, at each side of the machine, pivotally connected at one end as at 36 to a cross frame member 4b of the machine frame, and the piston rod 37 of each said hydraulic means is connected pivotally to an arm 38 at 39. The arms 38 may be pivotally attached to the upper ends of the side brackets 10–10a by pivot shafts 40. Both of cylinders 35 are connected to the conventional hydraulic system of the propelling tractor by any convenient conduit means such as the nipple 41. The arms 38 are pivotally connected at their free ends to links 42 and said links are connected to the bracket members 24–24a by pivots 43 so that by proper control of fluid pressure within the cylinders 35 the entire pickup mechanism may be raised or lowered pivotally about the axis of roll 18.

*Stalk feeding mechanism*

Stalks of tobacco are gathered by the pickup mechanism one of which stalks is indicated in dotted lines at S, FIG. 3. The flaps 30 carried by belts 29 function to assist in moving the stalks from the ground up and onto the tops of shoes or skids 13, and onto the upwardly inclined belts 17. The stalks then move up the inclined surface provided by the belts 17 and 22 and, pass over the upper roll 18 at which point they are discharged upon a downwardly inclined plate 44 mounted transversely of the machine between the upright bracket members 10–10a as shown more clearly in FIGS. 1 and 3.

Figure 4:
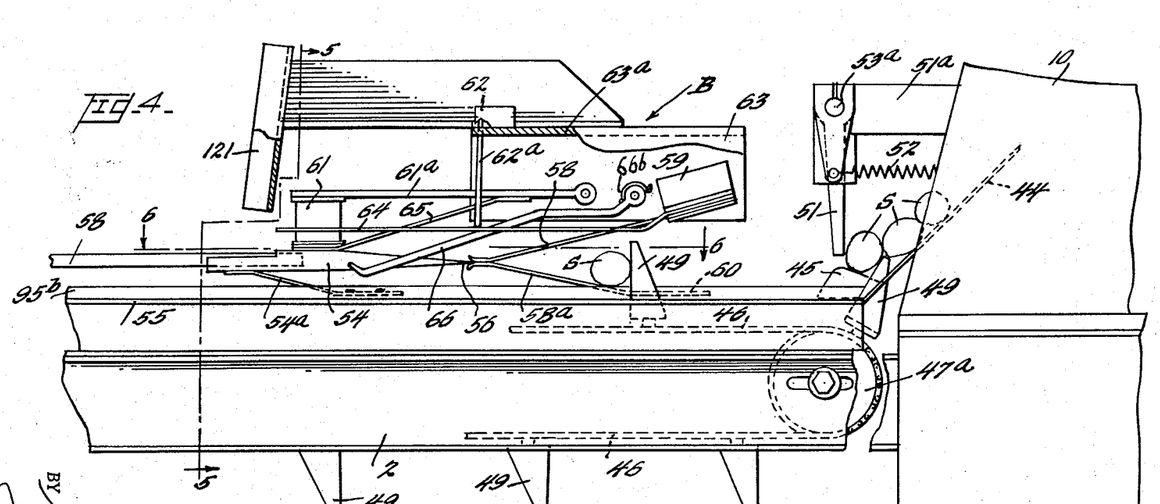
FIG. 4 is an enlarged detailed view of the spearing mechanism, with parts in section.

At the base of the plate 44 and intermediate the end edges thereof is mounted a suitable stop member 45. The stop 45 extends forwardly of plate 44 to a point close to the path of a chain which moves the stalks into the spearing mechanism, as will be described later herein. The stop 45 functions to cause the tobacco stalks as they roll down the plate 44 to build up back of this stop member as shown in FIG. 4, the more readily to facilitate moving the stalks one by one into the spearing mechanism.

Mounted lengthwise of the main frame of the machine as shown in FIGS. 1 and 2 is a link chain conveyor 46, the chain being trained around sprocket members 47 and 47a. The sprocket 47a is suitably journalled at the front end of the machine on a shaft 48, mounted between frame members 2 and 3 (see FIG. 5). The sprocket 47 is secured to a drive shaft 132 at the rear end of the machine. The conveyor chain 46 carries at suitably spaced intervals therealong plural groups of upstanding teeth or fingers 49. The present embodiment of the invention shows three such groups of fingers 49 indicated at 49a, 49b, and 49c, each including five teeth, but there may be a greater or lesser number of groups as desired. The number of teeth in each group determines the number of stalks to be speared on each lath, as will later appear. The sprocket 47a near the front end of the machine and adjacent to the pickup mechanism is disposed adjacent to the bottom of the transverse plate 44, as shown in FIGS. 1 and 4, and the stop member 45 is positioned substantially on the center line of the sprocket chain 46 so that the fingers 49 carried thereby pass on opposite sides of said stop member. The arrangement of the fingers 49 on the chain is more clearly shown in FIG. 5 wherein the chain is shown carrying tranversely disposed bars or plates 50 to which the fingers 49 are attached on opposite sides of the center line of the chain. Thus, the stalks build up behind the stop 45 (see FIG. 4) in position to be selectively engaged by successive pairs of fingers 49 as shown.

In order to prevent more than one stalk at a time being pulled from behind the stop by the fingers 49, a guard finger 51 is mounted above the top surface of the machine and transversely spaced from the stop 45 towards the front side of the machine as viewed in FIG. 2. The guard finger 51 is more clearly shown in FIG. 4 and is pivotally mounted from an upper bracket arm 51a carried by the bracket 10, and is spring biased towards the plate 44 and to a substantially vertical position by a spring 52 connected between an arm 53 secured to a pivot pin 53a, and to the side bracket 10. The guard finger 51 yields forwardly to permit passage of a stalk, and returns to the position shown. The finger 51 also functions to orient the stalks to a position substantially perpendicular to the center line of the chain as will later appear. As the pairs of fingers 49 carried by the chain 46 engage the stalks of tobacco successively positioned against the stop 45, the stalks are moved to the left as viewed in FIG. 4 into the spearing mechanism. FIG. 4 shows a stalk S in position just prior to being speared.

*Spearing mechanism*

Figure 10:
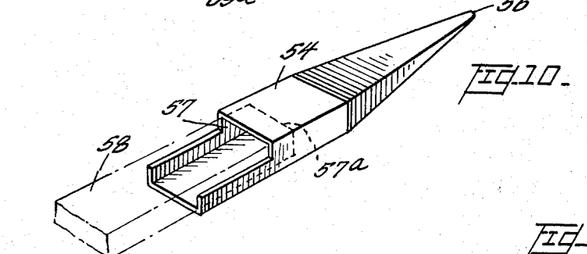
FIG. 10 is a perspective view of the spearhead.

The spearing mechanism C includes a spearhead 54 shown particularly in FIG. 10, the spearhead being supported in the machine in a position slightly raised above the upper face of the top plate 55 of the machine by a spring plate or finger 54a secured to said top plate 55. The spring plate or finger 54a is inclined upwardly and in the direction of chain movement as shown. The spearhead at its forward end is pointed and sharpened as at 56 to more readily penetrate a stalk of tobacco, and at its rear end is provided with a recess 57 adapted to receive the forward end of a lath shown in dotted lines at 58, on which lath the tobacco stalks are to be threaded.

The recess 57 is formed with an overhanging wall portion 57a so that the lath end is securely housed therein. The forward end of the spear 54 when in use, as shown in FIG. 4, is supported between a pair of spring fingers 58–58a. The spring finger 58 is supported at one end by a bracket 59 and extends downwardly therefrom in the direction of chain movement into engagement with the upper side of the spearhead 54 while the cooperating spring finger 58a is supported at 60 on a portion of the top plate 55 which overlies the upper run of the chain 46. The finger 58a extends upwardly and in the direction of chain movement into engagement with the spearhead 54. By this arrangement the stalks fed into the spearing mechanism by the chain fingers 49 enter the converging space formed between the spring fingers 58–

Figure 15:
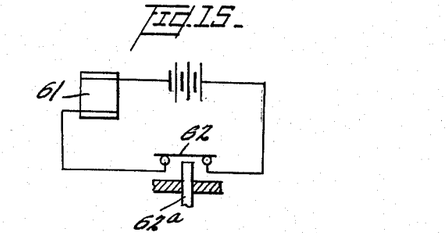
FIG. 15 is a diagrammatic view of the electric circuit containing the magnet.

58a and are thus centered with respect to the point 56 of the spearhead. To assist in holding the spearhead in proper substantially horizontal position and in cooperation with the spring plate or finger 54a, there is provided a magnet member 61 carried on a pivoted arm 61a in position to engage the body of the spearhead which, is preferably of ferrous metal and thus readily attracted by the magnet 61. Control of energization of the magnet 61 is obtained through a conventional switch member 62 mounted on the top wall 63a, of a housing member 63, there being an elongated switch operating pin 62a slidably mounted in said wall 63a. The switch 62 is normally closed to energize the magnet but is de-energized by opening the switch when a stalk being engaged with the spearhead engages a spring arm 64 which underlies the switch operating pin 62a. As shown diagrammatically in FIG. 15 the magnet 61 is connected through switch 62 to a source of potential such as a battery, which may be the battery usually supplied with automotive equipment, such as the tractor on which the harvester is mounted. The spring arm 64 may be conveniently supported on the bracket 59 which also carries the upper spring finger 58. Thus, as the stalk of tobacco is forcibly urged over the pointed end 56 of the spearhead 54 it will engage the spring arm 64, and by raising said arm the switch 62 is opened to de-energize the magnet 61, whereupon it is released from the spearhead 54 and further movement of the tobacco stalk along the spearhead will bring it into engagement with an arm 65 carried by the pivoted arm 61a and extending downwardly therefrom in front of the magnet, and to rest upon the spearhead and thus position the magnet 61 with respect to the spearhead. Furthermore, the inclined position of the arm 65 permits it to function as a cam to raise the magnet. Thus, contact of a stalk with the arm 65 raises the magnet out of contact with the spearhead 54 to permit passage of the tobacco stalk onto a lath 58 engaged in the recess 57 of the spearhead.

An additional pivotally mounted arm 66 is provided within the spearing mechanism to maintain the spearhead against lateral deflection and to this end the arm 66 has a bifurcated lower end portion 66a which straddles the pointed end 56 of the spearhead. The arm 66 may be spring biased downwardly to engage the spearhead by any convenient means such as a spring 66b.

Figure 5:
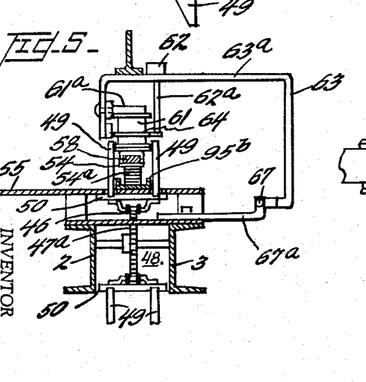
FIG. 5 is a transverse sectional view through the spearing mechanism on the line 5—5 of FIG. 4, on a reduced scale.
Figure 6:
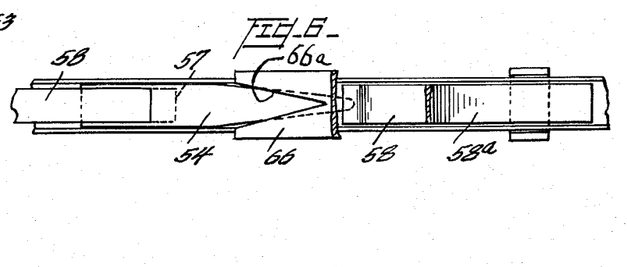
FIG. 6 is a partial sectional view taken on the line 6—6 of FIG. 4.

The spearing mechanism per se may be enclosed within the housing member 63 which is open at both ends and along the inside wall. It is pivotally mounted at 67 to a bracket 67a carried by the frame member 2 of the machine (see FIG. 5) in order to conveniently expose the mechanism associated with the spearing of the stalks, for adjustment and repair. The inner wall surfaces of the housing shown more clearly in FIG. 5 provide means for mounting the members 59, 61a, 66 previously referred to.

Transfer mechanism

Figure 9:
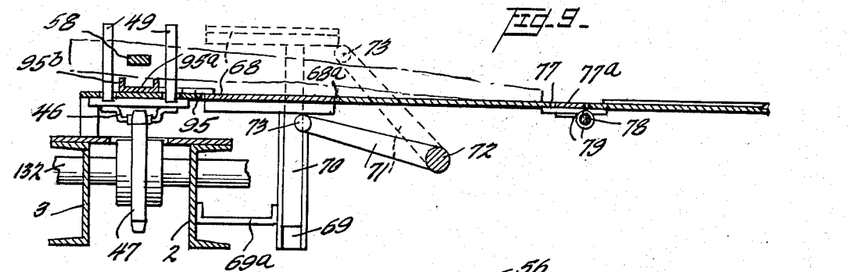
FIG. 9 is a sectional detail of the elevator mechanism on an enlarged scale.

Transfer mechanism is provided to move a lath on which the desired number of tobacco stalks have been speared, laterally of the machine to a conveyor which delivers the speared stalks and lath as a unit to a point at the rear of the machine. To this end the transfer mechanism includes an elevator mechanism shown particularly in FIG. 9 and comprising a vertically movable plate 68 mounted normally to lie flush with the top surface plate 55 of the machine and to close an opening 68a therein. The plate 68 is guided for vertical movement by spaced vertical guide members 69, one at each end of the plate, and secured in any convenient manner to the framework of the machine below the top plate 55 as by bracket members 69a, one of which is clearly shown in FIG. 9. The guide members 69 may be in the form of channel members with the channels of the opposite guide members facing one another. Within these guide members there are mounted for sliding movement slide rod members 70 which are secured at their upper ends to the underside of the elevator plate 68. It will be understood that the arrangement of the spaced guide channels 69 and the sliding rods 70 is such that the elevator plate 68 is maintained in a substantially horizontal position throughout the extent of its vertical movement. The elevator plate 68 is moved vertically by a pair of T arms 71 secured in spaced relation to a longitudinally extending shaft 72 mounted for rotation on the frame of the machine. Each of the T arms 71 at its free extremity is provided with a laterally extending head 73 which extends generally parallel to the axis of the shaft 72 and forms the head of the T-shaped arm 71. As shown in FIG. 9, the arms 71 are dimensioned in length so that when the shaft 72 is rotated, the T heads 73 at the ends of the arms 71 will engage beneath the elevator plate 68 and, by continued rotation of the shaft 72 and sliding movement of the heads across the bottom surface of the plate 68 will cause the elevator plate 68 to move vertically to a point above the top of the machine as shown in dotted lines in FIG. 9. This vertical movement of the elevator plate 68 causes the plate to engage beneath the several stalks which have been speared upon a lath, and raises the lath and stalks above the plane of the top plate of the machine and out of engagement with the teeth 49 of the chain. As the T heads 73 at the ends of the arms 71 move free of the elevator plate 68, as shown in dotted lines in FIG. 9, they engage the stalks of the tobacco which have been speared on the lath and due to frictional drag thereon move the stalks and lath laterally away from the path of the chain 46. The extent of this lateral movement is sufficient to deposit the speared stalks and lath as a unit more completely on the conveyor belt 9 previously referred to, for delivery to a point at the rear of the machine. The conveyor belt 9 is mounted upon transversely disposed rollers 74 and 75, the belt being disposed at the side of the machine opposite that where the chain 46 is mounted and is driven so that the upper run of the belt which overlies the top plate 55 moves from right to left as viewed in FIG. 1. The belt 9 normally moves the top portion of the stalks along at substantially the same speed as does the chain 46 the butt ends thereof. The mounting and drive of the belt will be fully described later herein.

The top plate 55 of the machine is provided with transverse slots 71a to permit rotary movement of the arms 71 to a point above the top of the machine as described. Furthermore, in order to permit the T arms 71 to pass below the top of the machine in continuous rotation, the top 55 at a point laterally displaced from the elevator plate 68 is further provided with openings 76 and 77 for said arms and closed by trap doors 76a and 77a. Each trap door is pivotally mounted for movement about a hinge pin 78, mounted parallel to the axis of shaft 72 and the doors are spring biased to closed position by springs 79 operatively associated with the hinge pin 78 of said mounting as shown in FIG. 9. The trap doors are arranged to open downwardly against the bias of the spring 79 when engaged by the respective T heads 73 of the arms 71 as shown in dotted lines in FIG. 9, and after said arms have passed the trap door will close under the spring bias 79.

Figure 8:
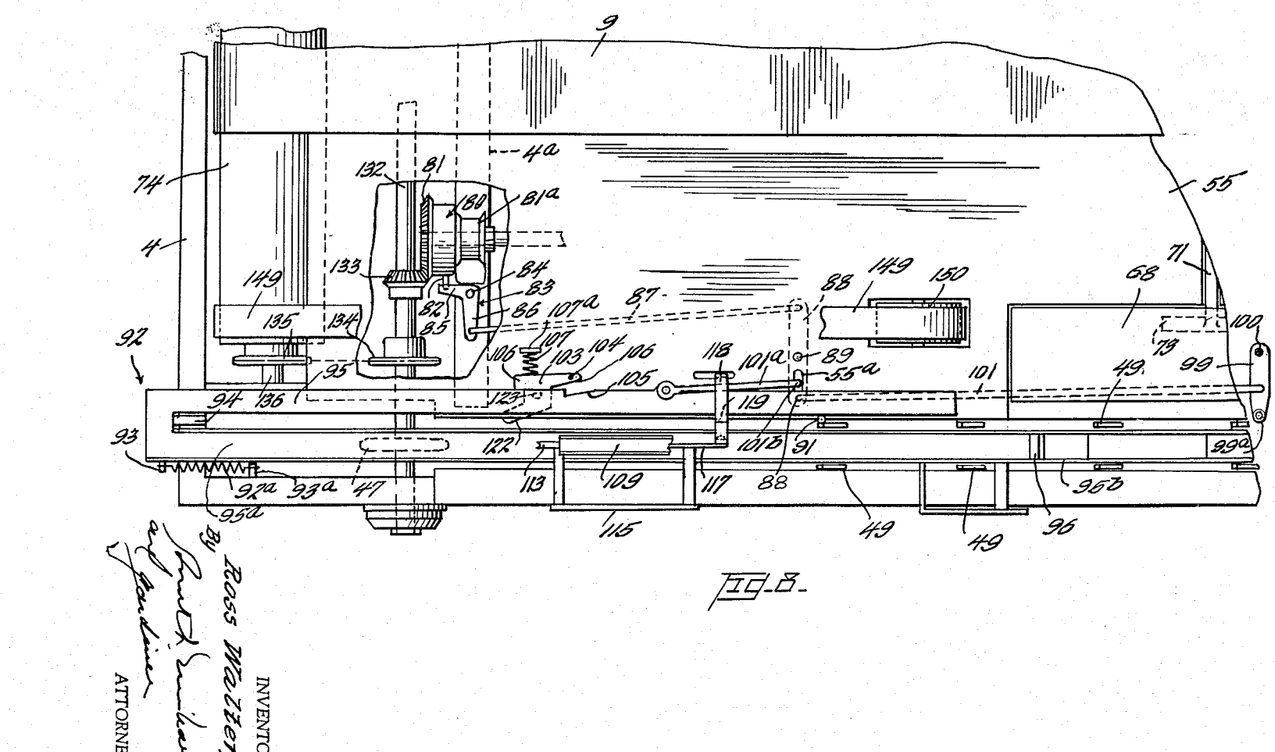
FIG. 8 is a fragmental plan view of the levers for controlling the transfer of loaded laths from the spearing mechanism.

The transfer mechanism, including the rotation of the shaft 72 is automatically controlled, in timed relation to the movement of the chain 46 by means of conventional one-revolution clutch mechanism indicated generally by the reference character 80, see FIG. 8. The one-revolution clutch per se forms no part of the present invention and is purely conventional in construction. It includes a driven gear element 81 connected by a clutch element 81a to shaft 72, the clutch element carying a radial pin or abutment 82. A bell crank lever 83 is pivotally mounted on a cross frame member 4a of the machine by pivot 84. One arm 85 of the bell crank is normally disposed to lie in the path of movement of the pin 82 to block rotation of the clutch element 81a and the shaft 72. The other arm 86 of the bell crank is connected to a link 87 which in turn is connected to one end of a lever 88 mounted beneath the top plate 55 for pivotal movement about a substantially vertical pivot 89. The opposite end of the lever 88 is connected to a linkage mechanism by which the bell crank 83 is rocked to energize the clutch 80 and thus operate the elevator mechanism in a manner later to be described.

*Lath release*

Due to the fact that the forward or leading edge of the lath on which tobacco stalks are being speared is engaged beneath the overhanging wall 57a of the socket 57 of the spear member 54, it is necessary to withdraw the end of the lath from said socket before the elevator and transfer mechanism just described can function. To this end a release mechanism for the lath is provided, the same including a generally U-shaped slide member indicated generally at 92 in FIG. 8. The member 92 is slidingly mounted on the top plate 55 of the machine and is spring urged to the right as viewed in FIG. 8 by tension spring 92a connected at one end to a pin 93 carried by the slide member near its left-hand end and at its opposite end to a pin 93a secured to the machine. Thus, the spring 92a will resiliently urge the slide member 92 towards the right as viewed in FIG. 8 into engagement with a suitably positioned abutment such as shown at 94. The spring 92a associated with the slide member 92 as described functions to maintain the forward end of the lath being loaded with tobacco stalks, in proper nested relation with the socket 57 of the spearhead 54 as will be more particularly described hereinafter. The U-shaped slide member 92 includes generally parallel laterally spaced arms 95 and 95a. The portion 95 of the slide 92 overlies the top of the machine inwardly of the chain whereas the portion 95a of the slide overlies the upper end of the conveyor chain 46 and is positioned to lie between the paths of movement of the laterally spaced teeth 49 of the chain. The portion 95a of the slide 92 is provided with a lath engaging abutment 96 which may be generally L-shaped in form (see FIG. 2) and secured by any convenient means to the upper surface of the slide member. The upstanding portion 97 of the lath abutment carries a terminal portion 98, the function of which will be more clearly described hereinafter. Forwardly of the abutment 96 the slide arm 95a may be provided with upstanding side flanges 95b to confine the laths thereon. It will be understood that the spring bias exerted by spring 92a on slide 92 will urge the abutment 96 against the rear end of a lath engaged with the spearhead to retain the forward end of the lath within the socket 57.

To release the lath from the socket in the spearhead, there is provided a mechanism including a lever 99 pivotally attached to the undersurface of the table top as at 100 and extending outwardly generally parallel to the top 55 to a point beneath the upper run of the chain 46. The lever 99 carries a roller 99a at its outer end disposed in the path of movement of pins 91 carried by the chain 46. The pins 91 are carried by and depend from chain links which are adjacent to the first tooth 49 of a group of teeth, such as previously referred to. It will be understood that each group of teeth 49a, 49b, and 49c has associated with the leading tooth of said group a depending pin.

Figure 14:
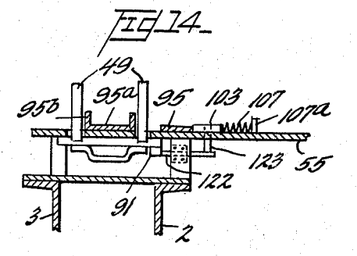
FIG. 14 is a view similar to FIG. 13 showing the latch and its release mechanism.

The lever 99 when actuated by a pin 91 is arranged to retract the slide 92 against the tension of the spring 92a. To this end the lever 99 is connected by a link 101 to the lever 88 at a point 88a and said lever 88 is in turn connected to the slide arm 95 by a link 101a. Since the slide arm 95 is on the top of plate 55, and the lever 88 is beneath said plate, the plate 55 is slotted at 55a to provide for a connecting pin 101b which connects the link 101a and the lever 88. The lever 99 and the roller 99a carried thereby is positioned in the path of movement of the chain 46 at a point so that when pin 91 engages the roller 99a, the slide member 92, through the link 101a is moved rearwardly about two inches, against the force of the spring 92a and thus retracts the lath abutment 96. Movement of the lever 99 also actuates the clutch 80 to operate the elevator mechanism through pin 101b carried on the link 101 and which is engaged within a slot or eye 88a in the end of the lever 88, whereby the lever 88 is rocked to exert a pull on the link 87 and thus remove the arm 85 from the path of the clutch pin 82. Continued movement of the chain is communicated to the loaded lath by the teeth 49 of the chain in contact with the several stalks of tobacco which have been speared upon the lath, and there is sufficient drag of the stalks upon the lath to shift the lath to the left a slight amount, sufficient to disengage the forward end of the lath from the spearhead. In order temporarily to retain the slide 92 in retracted position, in which the forward end of the lath is disengaged from the spearhead, a latch mechanism including a latch member 103 pivotally connected to the top of the machine by pivot 104 is provided, said latch being disposed in substantially coplanar relation to the arm 95 of the slide 92 (see FIG. 14). The side edge of the portion 95 of the slide 92 adjacent to the latch 103 is provided with a notch 105 which is normally displaced forwardly (to the right) slightly with respect to the lip 106 of the latch member. The latch member is urged against the adjacent notched edge of the slide by a spring 107 disposed between the latch and an abutment 107a which spring functions, when the slide bare 92 has been moved to the left as described, to urge the lip 106 of the latch into the notch 105 and thus retain temporarily the slide bar 92 in its retracted position against the bias of the spring 92a. With the parts in this position the elevator and transfer mechanism previously described is free to function in response to operation of the levers 99, 88, link 87 and bell crank 86, to elevate the lath and its speared stalks and transfer the same laterally to the conveyor belt 55.

*Lath replacement mechanism*

Figure 7:
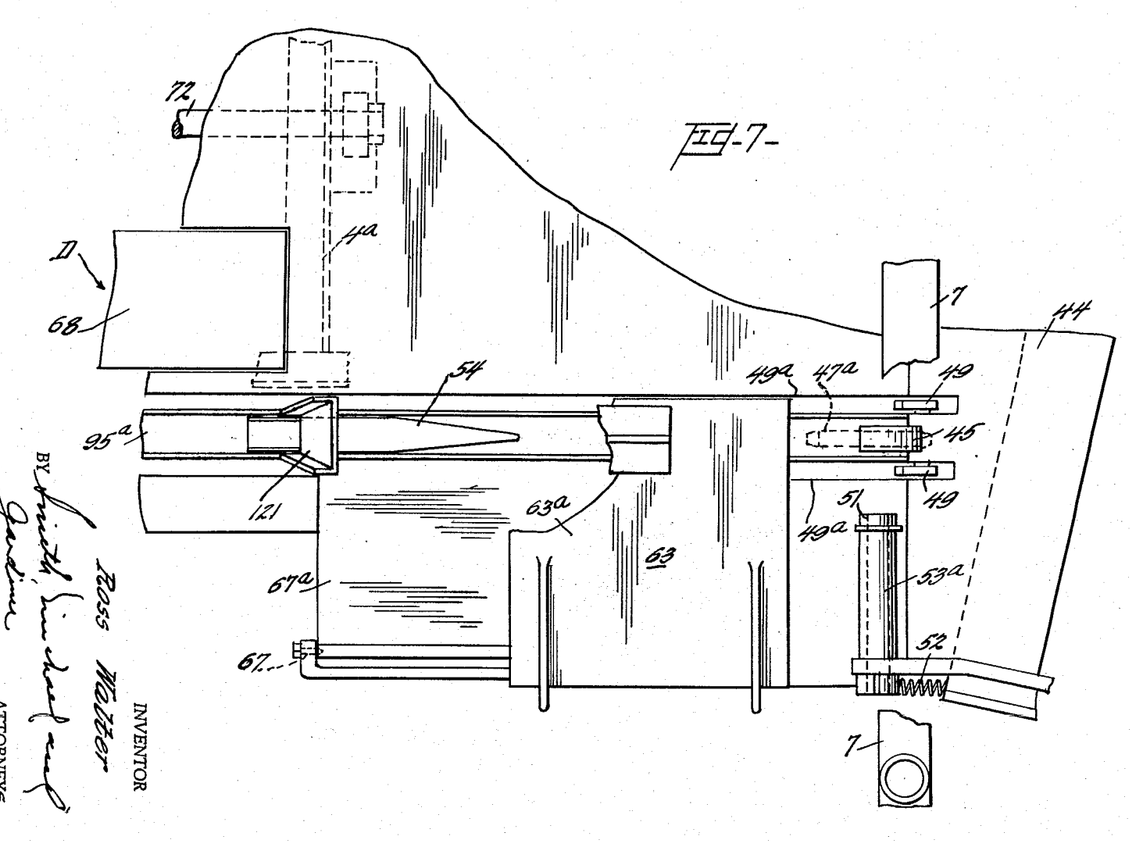
FIG. 7 is a top view of the spearing and stalk feeding mechanism.
Figure 16:
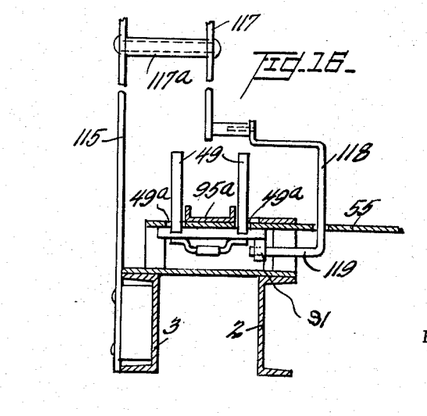
FIG. 16 is a detail view showing the mounting for the lath supplying lever mechanism.

Following the removal of a lath having its predetermined load of tobacco stalks as described, it is necessary to provide a new lath in position to receive the tobacco stalks which will be fed to the spearing mechanism by the next succeeding group of conveyor teeth 49. To this end there is provided an upstanding bracket 108 secured to the side frame of the machine and carrying at its upper end a lath tray 109 pivotally connected at a point intermediate its ends to the upstanding bracket by a pivot or shaft 110. The lath tray 109 is in the form of a channel shaped member, the open portion of the channel facing upwardly as shown and is arranged in respect to its pivotal mounting so that it is biased to swing in a counterclockwise direction and rest on supporting arm 111 as shown in full lines in FIG. 2. Attached to the lath tray 109, forwardly of its pivot 110 is a lug 109a to which is attached one end of a cord or cable 112. The cable 112 passes over a roller 113 rotatably carried at the upper end of an arm 114 which forms part of an upstanding arm 115 carried by the frame of the machine rearwardly or to the left of the bracket 108 as viewed in FIG. 2. The cable 112 after passing around the roller 113 is attached to the upper end 116 of a lever 117 pivoted intermediate its ends at 117a on the arm 115. The lower end of the arm 117 carries a downwardly extending lug 118 which carries a laterally extending foot portion 119 disposed beneath the upper run of the chain 46 and in the path of movement of the pin 91. The parts 115, 117 and 119 may be mounted as shown in FIG. 16. Thus, in properly timed relation, the pin 91 after engaging the roller 99a will engage the lug 119 to move the arm 117 clockwise about its pivot 117a. This puts tension on the cable 112 and causes the lath tray 109 to move in a clockwise direction about its pivot. An operator, stationed on the machine periodically and successively deposits laths in the lath tray 109 when it is in the position shown in full lines in FIG. 2, so that when the tray is tilted as just described, a lath in the tray slides forwardly within the tray under the influence of gravity and the forward end 120 thereof slides downwardly into a channel shaped lath guide 121 mounted on the frame of the machine just to the rear of the spearing mechanism, and as indicated more particularly in FIGS. 2 and 7, and has an open bottom in register with the open top of the spearhead socket 57. The engagement of the forward end of the lath with the guide 121 arrests forward movement of the lath and it drops into the socket in the spearhead and the rear end of the lath then slides down the lath tray 109 as the same continues to move in a clockwise direction until at the time the forward end of the lath tray engages the upstanding terminal abutment 98 of the lath abutment 96, previously referred to, the rear end of the lath slides clear of the lath tray 109 and drops in front of the vertical lath abutment 97. At this point a latch release mechanism is operated to remove the latch 103 from operative engagement with the notch 105 of the slide 92. The release mechanism (see FIG. 14) includes a cam member 122 carried by a pin 123 which in turn is attached to the latch 103 by pin 123. The cam 122 is disposed below the plane of the table top in the path of movement of the pin 91 as shown so as to be engaged thereby and moved inwardly to thereby move the latch 103 out of engagement with the notch 105, thereby permitting the slide member 92 to move forwardly under the bias of the spring 92a which movement, through the lath abutment 96 carried by said member 92, forcibly moves the lath forwardly for proper engagement within the recess in the spearhead 54 as previously described.

In order to maintain the spearhead in proper position during removal of a loaded lath therefrom for transfer to the delivery conveyor 9 as described, it will be understood that the magnet 61 is energized immediately following the passage of the last stalk to be loaded on a given lath, from under the switch operating arm 64 and associated members 65, allowing the switch operating pin 62a to fall and thereby close the switch 62, and thus energize the magnet 61. Thus, the magnet holds the spearhead in position during withdrawal of a lath therefrom and the operation of supplying a new lath thereto, after which the spear is held in place by the new lath, the spring biased slide 92, and the guide fingers 58 and 58a as previously described.

*Drive mechanism*

As previously indicated, the entire mechanism is adapted to be mounted beneath a tractor and driven from a conventional power takeoff with which the tractor is normally equipped. Thus, as shown in FIG. 1, the apparatus is driven from a conventional power takeoff shown at 124 having a shaft 125 connected by sprocket chain 126 to one shaft 127 of a gear box 128 which has a drive shaft 129 projecting laterally from the machine frame member 1. The shaft 129 is connected by sprocket and chain mechanism 130 to shaft 132 journalled in the machine frame members 1, 2, 3, as shown. Shaft 132 carries a miter gear 133 which forms the drive gear for the one-revolution clutch 80 previously described. The clutch 80 is conventional and the pin 82 thereof is operable to connect or disconnect the clutch element 81a to the gear 81 in a known manner depending upon whether said pin 82 is engaged with or disengaged from the bell crank lever arm 85. The shaft 132 further carries a sprocket 134, chain connected to a sprocket 135 carried by the shaft 136 on which the rear conveyor drive roller 74 is mounted. The conveyor belt 9 drives the forward conveyor belt roller 75. The conveyor belt roller 75 is mounted on a shaft 137 journalled in side frame 1 and a bracket member 137a and adjacent the bracket carries a sprocket gear 138 which is connected by sprocket chain 139 to a sprocket 140 carried by a shaft 141, the latter being supported by the forwardly extending bracket 137a secured to the main frame of the machine. For a purpose to be hereinafter described, the pickup mechanism is mounted at a slight angle to the longitudinal axis of the machine and thus the shaft 141 is disposed at an angle to and is connected by a universal joint 141a to a shaft 142 which underlies and is generally parallel to the shaft 19 of the upper roller 18 of the pickup mechanism, to which it is connected by drive sprocket and chain mechanism indicated at 143 (see FIG. 3). The shaft 19 also drives the belt mechanism of the upper frame member 23–23a of the pickup mechanism by a sprocket and chain mechanism 144 driving a sprocket 145 on shaft 146. The shaft 146 drives the belt system 29 of the upper frame 23, said shaft carrying a gear 147 in mesh with a gear 147a on shaft 148 of roller 26. The inclusion of the gear 147 is for the purpose of insuring the proper direction of drive for the belts 29, that is so they will move in the same direction as do belts 17–22 on the lower member of the pickup mechanism as previously described.

The shaft 132 also carries a sprocket 47 which is in mesh with and drives the sprocket chain 46.

In order to assist in the rearward movement of the tobacco stalks which have been speared on a given lath, and transferred to the delivery conveyor 9, a supplemental conveyor 149 is provided near the rear end of the machine near the chain 46 and positioned to engage beneath and support the speared stalks in the region of the lath on which they are speared, to relieve any drag between the stalks and lath and the machine top 55. The belt 149 is trained, at one end, about the roller 74 which drives the main conveyor belt 9 and at the opposite end is trained about a roller 150 (see FIG. 1) mounted on the machine frame in position to dispose the upper run of the belt 149 slightly above the plane of the top plate 55.

*Operation*

Figures 11, 12:
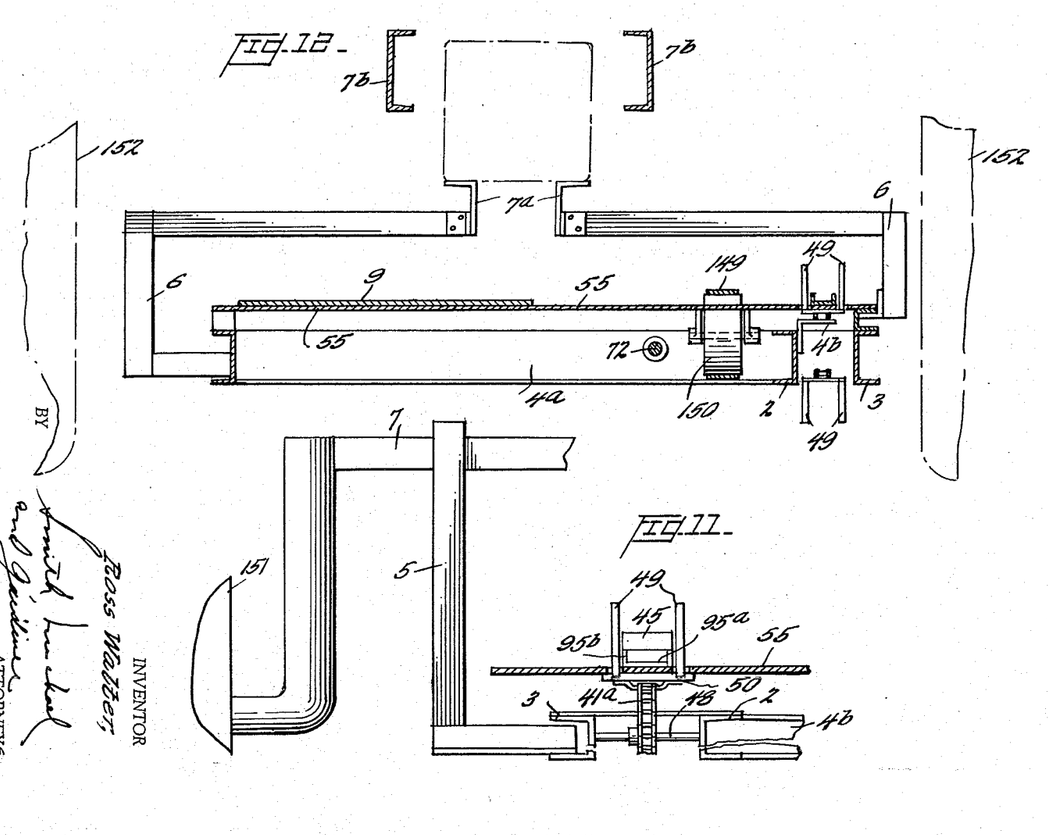
FIG. 11 is a fragmental detail view with parts shown in section and showing the relation of the apparatus to the front end construction of the tractor.
FIG. 12 is a rear view, partly in section of the apparatus supported from a tractor.
Figure 13:
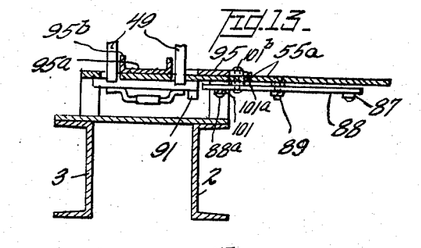
FIG. 13 is a fragmental detail partly in section showing the manner in which the control levers are mounted.

As previously described, the apparatus of the present invention is designed to be mounted upon a conventional, high clearance tractor in a position between the under portions of the tractor frame and the ground. While there are several different makes of tractors that may be used to support the invention as described, the Allis-Chalmers Manufacturing Company's tractor Model D14 described and illustrated in their catalogue bearing the following identification Form TM–137B, is admirably suited for use as described herein. FIG. 11 shows the general relative position of the forward wheel 151 of a tractor together with a portion of the front axle thereof, and FIG. 12 shows a similar fragmental view of the rear portion of the tractor wherein the rear wheels 152 are shown in order to illustrate the relative position of the machine with respect to the running gear of the tractor on which it is mounted. With the machine so mounted, and the cylinder 35 connected to the hydraulic control mechanism of the tractor through the nipple connection 41 as described, the pickup mechanism indicated generally at A may be elevated to an inoperative position for movement of the tractor and the machine of the present invention, to a field in which it is to be operated.

As previously indicated, the machine is designed to pick up previously cut stalks of tobacco which have laid in the field after cutting a sufficient length of time to become properly withered, to facilitate spearing without splitting the stalks. The stalks when cut are deposited in rows, lying generally parallel to each other and generally transverse to the row from which they were cut. In order to facilitate the pickup of the stalks so positioned, the pickup mechanism at the forward end of the machine is disposed at a slight angle to the longitudinal axis of the machine so that the pickup mechanism may be positioned as close to the standing stubs of tobacco left after the stalks have been cut (as indicated at SS in FIG. 1), as is possible and still give side clearance for the tractor wheels on the side of the tractor which are proximate to the said row of stubs. When the operator is ready to proceed, the hydraulic cylinder 35 which controls the elevation of the pickup mechanism is operated to lower the pickup mechanism until the shoes 13 thereof engage the surface of the field in which the machine is to work. As previously stated, these shoe members are designed to penetrate the ground up to a point determined by the limiting wing guides 14, so that the upper surfaces of the shoe members ride substantially at ground level and can thus readily engage under the grown tobacco stalks as the machine moves forward. The transmission control mechanism, conventional on tractor power takeoff mechanisms, is now operated to put in motion the apparatus of the invention as described, which is initiated by driving the shaft 125 as described. The machine is then moved forwardly through the field under its own power and the tobacco stalks are passed up the lower inclined frame of the pickup mechanism under the influence of the belts 17 and 22, assisted by the belts 29 and the flaps 30 connected thereto, associated with the upper pickup frame 23. The belts 29 of the upper pickup frame are driven in the same direction as the belts 17 and 22 of the lower pickup frame and at a slightly higher rate of speed (note relative size of gear 147 and sprocket on rollers shaft 18), so that there is a tendency to roll the stalks along the belts 17 as they move upwardly, this rolling operation tending to compact gently the tobacco leaves about the stalks as a center in order to facilitate handling. If desired, base plates 152 may be provided to underlie the belts 17 and 22 to support them and resist pressure by the upper belts 29.

The stalks of tobacco move up the inclined lower belt mechanism of the pickup device and pass over the upper end thereof and slide down the inclined plate 44 where they pile up in an orderly fashion, against the stop member 45. As previously described, the stalks are removed one by one from behind the stop member 45 and control finger 51 by the teeth 49 on the conveyor chain 46. As previously described, the stop finger 51 is displaced laterally with respect to the stop 45 so that the stalks are engaged by the fingers 49 there is a tendency to swing the stalks slightly in a counterwise direction about the stop finger 51 as a fulcrum to position the stalks substantially perpendicular to the path of movement of the conveyor chain. The teeth 49 of the conveyor chain are, as described, arranged in groups there being a number of teeth in each group corresponding to the number of stalks which are to be speared on a given lath. The individual groups of teeth are spaced from each other along the chain in order to provide between successive groups a portion of chain having no teeth, in order to provide an interval after the removal of a loaded lath from the spearing mechanism to provide time for supplying a new lath to the spearing mechanism, as described, before a succeeding group of teeth begins to feed stalks into the spearing mechanism. These spaces between successive groups of teeth are clearly indicated in FIG. 2 by the reference character 153. Assuming a lath has been properly positioned in the socket of the spearhead as described, the teeth 49 successively move the stalks into the spearing mechanism, where they are guided by the fingers 58 and 58a centrally onto the sharp end of the spear and thence along the spearhead onto the lath. As the stalks move through the spearing mechanism they successively engage the spring arm 66, the switch operating arm 64 and the magnet elevating arm 65 as described, the movement of the arm 64 in response to engagement of a stalk therewith functioning to de-energize the magnet 61 through the switch mechanism 62. The relation of the switch 62 and the magnet 61 to a source of energizing potential is clearly shown diagrammatically in FIG. 15. As previously stated, the magnet 61 when energized, maintains in position the spearhead 54 while a loaded lath is being withdrawn from the spearhead and as a new lath is being inserted therein, but during the actual spearing operation, the magnet is de-energized and elevated to permit passage of the stalks onto the spearhead without interference to the passage of the stalks by the magnet.

When a predetermined number of stalks has been thus speared or threaded onto a lath, as determined by the number of teeth in a given group of teeth on a chain, the loaded lath is released from the spearhead by moving the slide member 92 rearwardly due to engagement of a pin 91 with the roller 99a of the arm 99 as previously described. When thus moved rearwardly, the slide 92 is latched into its retracted position by the latch mechanism 103, after which the one-revolution clutch mechanism 80 functions to drive the shaft 72 and rotate the arms 71 of the elevator mechanism one complete revolution. The arms 71 as described raise the elevator plate 68 to raise the lath and attached stalks above the plane of the plate 55 and as the T-heads 73 pass clear of the plate 68, they engage the stalks to move the stalks and lath to which they are attached laterally clear of the chain and onto the conveyor 9 for subsequent delivery at a point at the rear of the machine. Following removal of the loaded lath from the spearing mechanism as described, a new lath is deposited in the spearing position by the lath supply mechanish D previously described, after which the pin 91 engages the latch releasing cam 122 to move the latch to unlatched position whereupon the slide member 92 under the influence of the biasing spring 92a moves the slide forwardly (to the right) so that the lath abutment 96 carried thereby moves the new lath into proper position within the head or socket of the spearhead. The return of the slide 92 under the influence of the spring 92a also returns the levers 88 and 99 to normal position and again positions the arm 85 of the clutch 80 in the path of movement of the clutch pin 82. This cycle of operation is repeated so long as there are tobacco stalks piled up on the plate 44 behind the control stop 45 and finger 51.

It will be understood that the top plate 55 is provided with various cutout portions to accommodate elements of the apparatus mounted below the plate 55 and extending above the same. Thus, a pair of slots 49a are provided through which the teeth 49 of the chain 46 extend and travel. Also, the plate 55 is provided with an opening through which the belt 149 passes adjacent roll 150. At the rear end of the main frame adjacent the cross frame member 4, the plate 55 may be cut away as at 55a to provide for the passage of the belts 9 and 149 and to provide clearance for the clutch mechanism 80 as shown in FIG. 8.

It will be understood that while the apparatus is arranged to thread five tobacco stalks on each lath, this number can be varied as desired by changing the number of teeth 49 in the groups of teeth 49a, 49b, 49c, as previously described.

As thus described, it is apparent that I have provided a mechanism adapted to be attached to the underside of a tractor and controlled by the normal controls of the tractor for operation in a field of tobacco wherein the stalks have been cut and are laid in orderly rows for pickup. The apparatus of the invention is arranged to pick up the stalks individually, raise them to a desired elevation by a conveyor along which the stalks are rolled to compact the leaves and then deposited in position to be moved one by one, to a spearing mechanism by which they are, in predetermined number, loaded upon or speared upon laths by which they are normally supported in the curing barns.

The loaded laths are each removed as a unit to a conveyor mechanism which delivers the laths and stalks at a rear portion of the machine. Here, the loaded laths may be removed manually from the conveyor and conveyed by conventional means to the curing barn, or if desired, any conventional gathering mechanism may be associated with the rear end of the tractor to receive the loaded laths and elevate them to a point where they may be deposited in a vehicle driven alongside the tractor.

The invention also provides means whereby laths may be manually fed to a charging mechanism, by which the laths are successively fed into spearing position following removal of a loaded lath from the machine.

It will be understood by those skilled in the art to which the invention relates that the foregoing embodiment of the invention is but for the purpose of illustration only and that various changes may be made therein without departing from the spirit of the invention, which is more clearly defined in the appended claims.

I claim:

1. In a tobacco harvesting machine, means for spearing tobacco stalks onto laths including a spearhead having a socket to receive the end of a lath, means for supporting said spearhead in spaced relation to a surface over which the tobacco stalks are moved towards said spearhead, feed means for engaging tobacco stalks to move them successively over said spearhead onto a lath operatively associated with said socket, movable abutment means engaging the other end of a lath for restraining said spearhead and lath seated in said socket against lineal movement in the direction of thrust developed when a stalk is being speared thereon, said feed means including means for releasing said abutment means and for moving a loaded lath lineally in the direction of thrust to withdraw a loaded lath from said socket of said spearhead and means for restraining said spearhead from movement with the lath during the withdrawal of the lath from the socket, said last-mentioned means including a magnet positioned to supportingly engage the spearhead when the magnet is energized, and means for periodically energizing the magnet at the time the lath is being withdrawn from the spearhead.

2. The apparatus described in claim 1 wherein said magnet is mounted upon a movable arm disposed in position to be engaged by a stalk passing through said spearing mechanism whereby to move the magnet out of the path of a stalk being speared, when de-energized.

3. The apparatus described in claim 2 wherein a switch for controlling energization of the magnet is provided, and switch actuating means for opening and closing said switch in response to movement of stalks through said spearing mechanism, said switch actuating means being positioned in advance of the movable arm which carries the magnet.

4. In a tobacco harvesting machine a spearhead having a lath receiving socket at one end and a stalk penetrating point at the opposite end, means for supporting said spearhead in stalk-receiving position, means for maintaining one end of a lath in engagement with said spearhead socket including a slidingly mounted spring biased abutment engageable with the opposite end of the lath, means for moving said slidable abutment against the force of its bias to release said lath from the spearhead socket when said lath is loaded, and latch means for restraining the abutment member in its lath-releasing position, means for feeding tobacco stalks one by one onto a lath seated in said spearhead socket, means for moving a loaded lath laterally from alignment with the socket of the spearhead while said abutment is latched in retracted position, means for supplying another lath to the spearhead socket, and means positioned to be engaged by said stalk feeding means after a predetermined number of stalks have been speared onto a lath for releasing said latch to render said spring bias effective to seat the new lath in said spearhead socket.

5. In a tobacco harvesting machine, means for spearing tobacco stalks onto a lath, a spearhead, means for supporting the spearhead in position to receive tobacco stalks passed longitudinally thereover, said spearhead having a socket in which one end of the lath is adapted to be seated, means for feeding tobacco stalks over said spearhead and onto said lath, movable abutment means engageable with the opposite end of the lath to restrain it against lineal movement due to thrust thereon when tobacco stalks are fed thereonto, said feed means including means for moving said abutment means out of engagement with said lath to allow lineal movement of the lath away from said spearhead in the direction of movement of the feed means for releasing the lath from the spearhead socket when the lath has been loaded with tobacco stalks, and means responsive to continued movement of the feed means for moving the loaded lath laterally out of alignment with said spearhead including an elevator plate, means mounting the same on the machine in position to underlie the path of movement of a lath bearing a load of stalks that have been speared thereon, machine driven means for actuating said elevator means in timed relation to said feed means and including a shaft mounted for rotation on the machine below and laterally of the path of travel of a loaded lath, an arm carried by the shaft and positioned to engage the underside of said plate when the shaft is rotated, guide means for mounting the elevator plate for up and down reciprocating movement, said plate when engaged by said arms being raised to engage and lift a loaded lath clear of the feed means and the spearhead, said arm on said shaft carrying a laterally extending stalk engaging member at its outer end disposed to engage the impaled stalks on said lath when said stalk engaging member moves clear of the under side of said elevator plate under continued rotation of said shaft, said stalk engaging member serving to engage and move the lath and stalks laterally away from the path of movement of the feed means and the spearhead, and a conveyor positioned laterally of the feed means to receive the lath and stalks at a unit for delivery from the machine.

6. The apparatus described in claim 5 wherein an opening is provided at the top of the machine through which the stalks engaging member carried by said arms may pass to a position beneath said top.

7. The apparatus described in claim 6 wherein a spring biased trap door normally closes said opening, said trap door being hingedly mounted to open downwardly when engaged by said stalk engaging member.

8. The apparatus described in claim 5 wherein a second belt conveyor is provided on the machine having an upper run positioned to engage beneath the butt ends of the stalks near the lath on which they are threaded to support the same and thereby prevent dragging resistance thereof on the top of the machine as they are moved by said first-mentioned conveyor for discharge from the machine, and means for driving said first and second conveyors at the same speed and in the same direction.

9. In a tobacco harvesting machine, means for spearing tobacco stalks onto a lath comprising a spearhead and means for supporting it in position to enable tobacco stalks to be impaled thereon, said spearhead having a socket to receive one end of a path onto which tobacco stalks impaled by the spearhead are to be supported, feed means for feeding stalks of tobacco over said spearhead and onto a lath seated in said socket, movable abutment means biased for engagement with the opposite ends of a lath seated in said socket for retaining said lath within said socket while the lath is being loaded with tobacco stalks, and means for removing a loaded lath from the spearhead including means for retracting the abutment means against the force of the bias, latch means for releasably holding the abutment means in retracted position, and means for moving the loaded lath lineally in the direction of movement of the feed means out of the spearhead socket while the abutment means is so retracted.

10. The apparatus described in claim 9 wherein means is provided for successively supplying laths to the spearhead socket, and means operating in timed relation to the feed means for actuating the lath supply means for depositing a new lath in the spearhead socket after a loaded lath has been removed therefrom.

11. The apparatus described in claim 9 wherein means is provided for releasing the latch, and means for supplying a new lath to the spearhead socket after the loaded lath has been removed therefrom, means for releasing the abutment restraining latching means, and means operated by and in timed relation to the stalk feed means for successively actuating the abutment retracting means, the loaded stalk removal means, the new lath supplying means, and the latch releasing means.

12. In a tobacco harvesting machine, spearing means for threading tobacco stalks onto a lath member, said means including a spearhead having a lath end receiving socket, and means for feeding tobacco stalks over said spearhead onto a lath seated in said socket, means for supplying lath to said socket including a pivoted lath tray mounting means for said tray normally disposing said tray in a position to hold a lath, means actuated by said feed means for tilting the lath tray to cause the lath therein to slide out of the tray toward the spearhead, a lath guide overlying the socket in the spearhead and positioned to receive the forward end of the lath and guide it into alignment with said socket, and a spring biased abutment means adapted to engage the opposite end of the lath for urging it into the socket, latch means for restraining said abutment means in a retracted position against the force of said bias, and means actuated by said feed means for releasing said latch means when a new lath has been aligned with said spearhead socket.

13. In a tobacco harvesting machine, means for spearing tobacco stalks onto laths including a spearhead having a lath-receiving socket and conveyor feed means operable to move the tobacco stalks onto said spearhead and onto a lath seated in said socket, means for restraining lineal movement of a lath and the spearhead during the spearing operation, means actuated by said conveyor for removing said restraining means when a lath has been loaded, said conveyor being operable to move a lath on which the tobacco stalks have been threaded out of said spearing means when said restraining means has been released, means for removing a loaded lath from said conveyor feed means including elevator means mounted laterally of the conveyor in position to be traversed by the tobacco stalks of a loaded lath moving with the conveyor means, and means for periodically raising said elevator means when the tobacco stalks of a loaded lath are moving thereover including a shaft, means for driving the shaft including a one-revolution clutch and means operating in timed relation to the conveyor means for energizing the one-revolution clutch to actuate the elevator means when the tobacco stalks on a loaded lath being moved by said conveyor means are in registration with said elevator means.

14. The apparatus described in claim 13 wherein the means operating in timed relation to the conveyor means includes a lug carried by the conveyor means and positioned thereon to engage an actuating lever for the one-revolution clutch, said actuating lever including a part disposed in the path of movement of said lug.

15. The apparatus described in claim 13 wherein said elevator means includes a plate member mounted for up and down movement, and wherein said shaft is mounted below and to one side of the plate and carries a radial arm engageable with the underside of the plate, when the shaft is rotated to raise the plate.

16. In a tobacco harvesting machine a spearhead having a lath-receiving socket at one end and a stalk-penetrating point at the opposite end, means for supporting said spearhead in stalk-receiving position, means for maintaining one end of a lath in engagement with said spearhead socket including a movably mounted spring biased abutment engageable with the opposite end of the lath for urging the lath into the spearhead socket, means for impaling tobacco stalks onto a lath seated in said spearhead socket, said means including a series of movable tobacco-stalk-engaging fingers for moving tobacco stalks over said spearhead and along said lath towards said abutment, means for so moving said fingers, means operating in timed relation to said impaling means for engaging and moving said movable abutment against the force of its bias to a retracted position out of engagement with said opposite end of the lath after a predetermined number of tobacco stalks have been impaled thereon, whereby continued movement of the stalk-engaging fingers engaged with the tobacco stalks on said lath moves said one end of the said lath out of the spearhead socket, and latch means for restraining the abutment member in its retracted position to permit insertion of a new lath in said spearhead socket.

References Cited by the Examiner
UNITED STATES PATENTS

| | | | |
|---|---|---|---|
| 875,998 | 1/08 | Hovey | 214—5.5 |
| 945,717 | 1/10 | Gullickson | 214—5.5 |
| 1,090,747 | 3/14 | Nunnelley | 56—27.5 |
| 1,134,206 | 4/15 | King | 214—5.5 X |
| 1,278,581 | 9/18 | Bowman et al. | 214—5.5 |
| 1,295,520 | 2/19 | Kepler | 56—358 |
| 1,323,404 | 12/19 | Motter et al. | 56—27.5 |
| 1,530,939 | 3/25 | Hawks | 214—5.5 |
| 1,843,852 | 2/32 | Troy | 214—130 X |
| 2,208,128 | 7/40 | Holbrook et al. | 198—8 |
| 2,297,310 | 9/42 | McClellan | 56—358 |
| 2,477,068 | 7/49 | La Motte | 56—27.5 |
| 2,477,257 | 7/49 | Lee | 198—8 |
| 2,495,874 | 1/50 | Stula | 214—5.5 |
| 2,502,225 | 3/50 | Krist | 214—5.5 |
| 2,652,932 | 9/53 | Funnell | 214—5.5 |
| 2,682,342 | 6/54 | Touton | 214—5.5 |
| 2,693,070 | 11/54 | Gout et al. | 56—27.5 |
| 2,776,760 | 1/57 | Covington | 214—5.5 |
| 2,813,390 | 11/57 | Irvine | 56—27.5 |
| 2,833,425 | 5/58 | Lee | 214—5.5 |
| 2,836,950 | 6/58 | Anderson | 56—27.5 |
| 2,923,116 | 2/60 | Brown | 56—27.5 |

HUGO O. SCHULZ, *Primary Examiner.*

CARL W. ROBINSON, RUSSELL R. KINSEY, MORRIS TEMIN, *Examiners.*